(12) United States Patent
Dekarske

(10) Patent No.: US 12,274,241 B1
(45) Date of Patent: Apr. 15, 2025

(54) PET COLLAR

(71) Applicant: David Dekarske, Lancaster, SC (US)

(72) Inventor: David Dekarske, Lancaster, SC (US)

( * ) Notice: Subject to any disclaimer, the term of this patent is extended or adjusted under 35 U.S.C. 154(b) by 0 days.

(21) Appl. No.: 18/371,445

(22) Filed: Sep. 22, 2023

(51) Int. Cl.
*A01K 27/00* (2006.01)

(52) U.S. Cl.
CPC .......... *A01K 27/001* (2013.01); *A01K 27/005* (2013.01); *A01K 27/009* (2013.01)

(58) Field of Classification Search
CPC ... A01K 27/00; F16C 11/0623; A44B 11/285; A44B 11/2534; A44D 2203/00
USPC ................. 403/141, 335; 292/251.5; 24/303
See application file for complete search history.

(56) References Cited

U.S. PATENT DOCUMENTS

| | | | | |
|---|---|---|---|---|
| 2,714,269 | A * | 8/1955 | Charles | A63H 33/062 59/900 |
| 4,044,725 | A * | 8/1977 | Miller | A01K 27/001 59/84 |
| 6,109,999 | A * | 8/2000 | Kuo | A63B 19/00 446/236 |
| 6,537,130 | B1 * | 3/2003 | Lee | A63H 3/04 446/485 |
| 8,904,744 | B1 * | 12/2014 | Cipolla | B21L 11/12 59/13 |
| 2011/0318093 | A1 * | 12/2011 | Liao | F16M 11/041 403/142 |
| 2016/0120154 | A1 * | 5/2016 | Hill | G08C 17/02 340/573.3 |
| 2023/0263275 | A1 * | 8/2023 | Decker | A44C 5/2071 24/303 |
| 2023/0309661 | A1 * | 10/2023 | Stearns | A44B 11/2588 24/303 |

FOREIGN PATENT DOCUMENTS

FR 2418632 A1 * 9/1979 ........... A44C 5/2071

OTHER PUBLICATIONS

Machine Translation of FR-2418632-A1, Auchere; Francois, Sep. 28, 1979 (Year: 1979).*

* cited by examiner

*Primary Examiner* — Richard Green
*Assistant Examiner* — Katherine June Walter
(74) *Attorney, Agent, or Firm* — Jeffrey C. Watson, Esq.; Grell & Watson Patent Attorneys LLC

(57) ABSTRACT

A pet collar. A plurality of connecting rods is pivotally connected via a ball-and-socket connection to a plurality of socket segments. A center section is pivotally connected via a ball-and-socket connection to two innermost socket segments. A collar connector is pivotally connected via a ball-and-socket connection to two outermost socket segments. In a preferred embodiment the collar connector includes a slidable magnet for locking the collar connector. Also, in a preferred embodiment the center section includes a NFT tag for pet safety and identification.

5 Claims, 7 Drawing Sheets

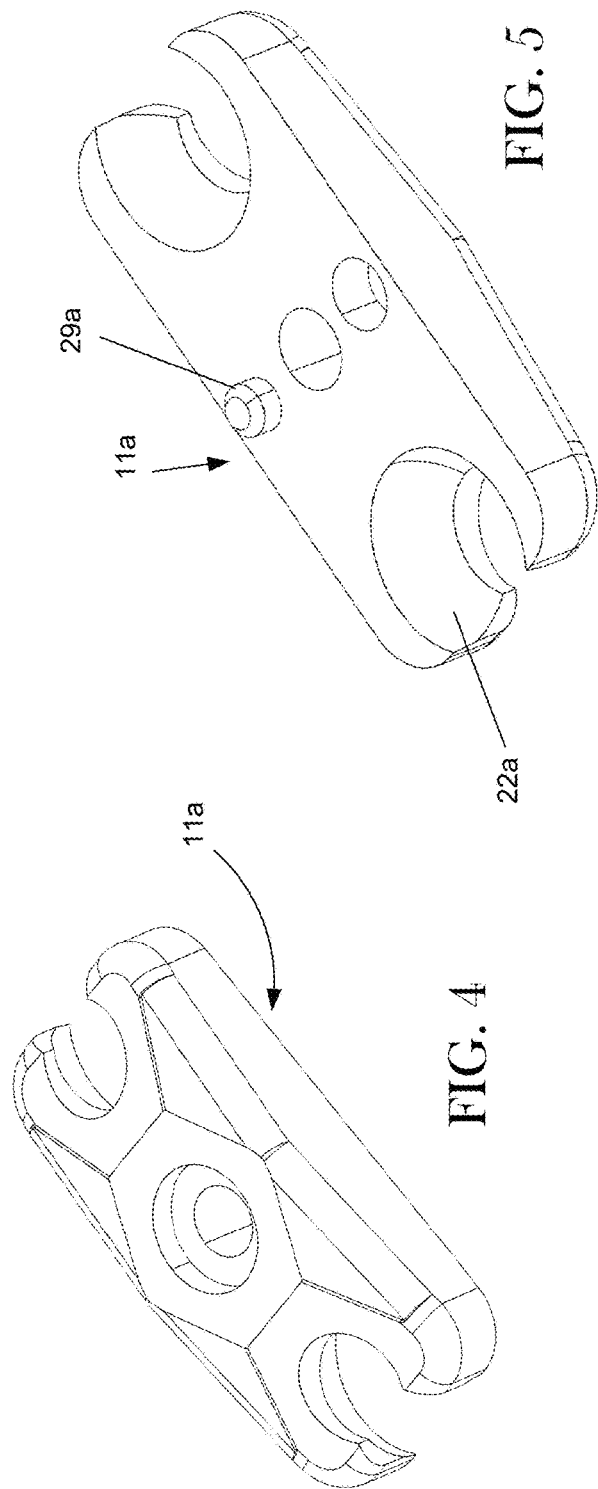
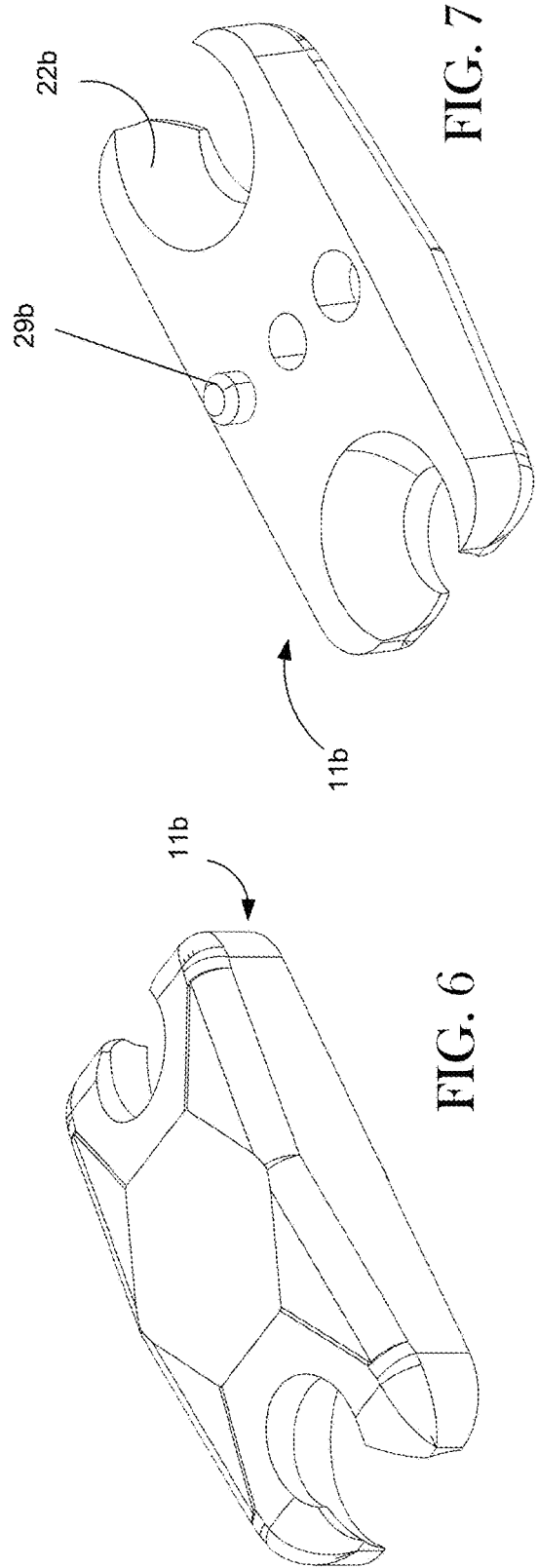

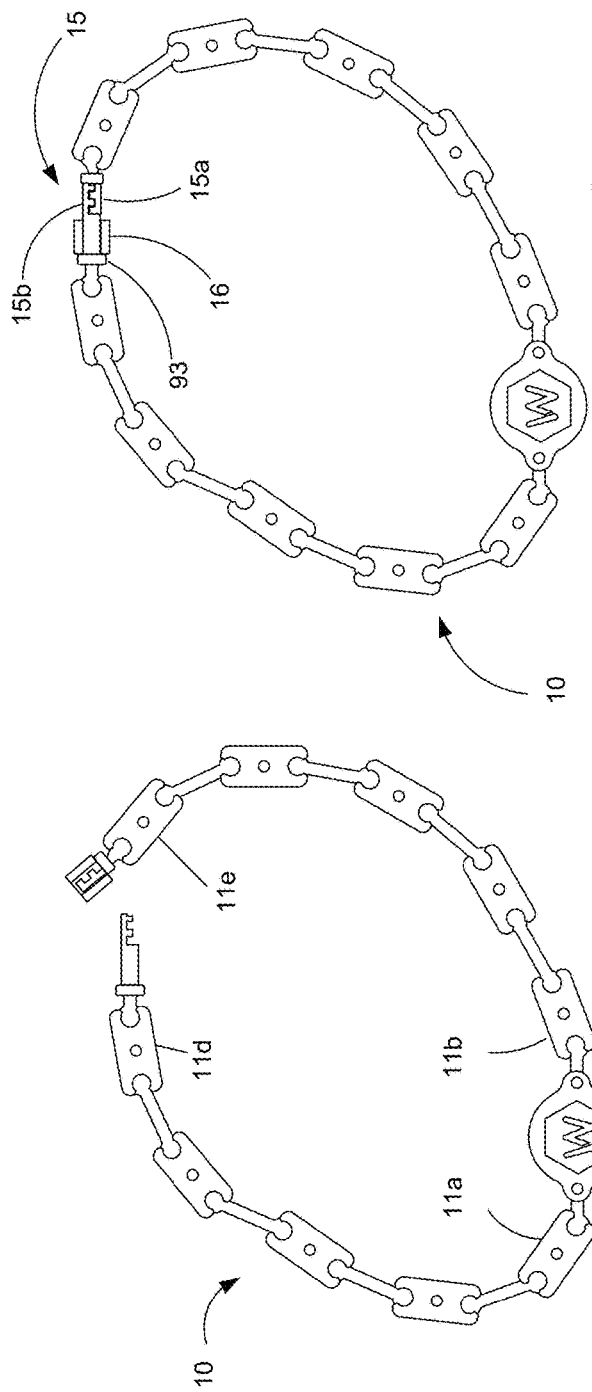
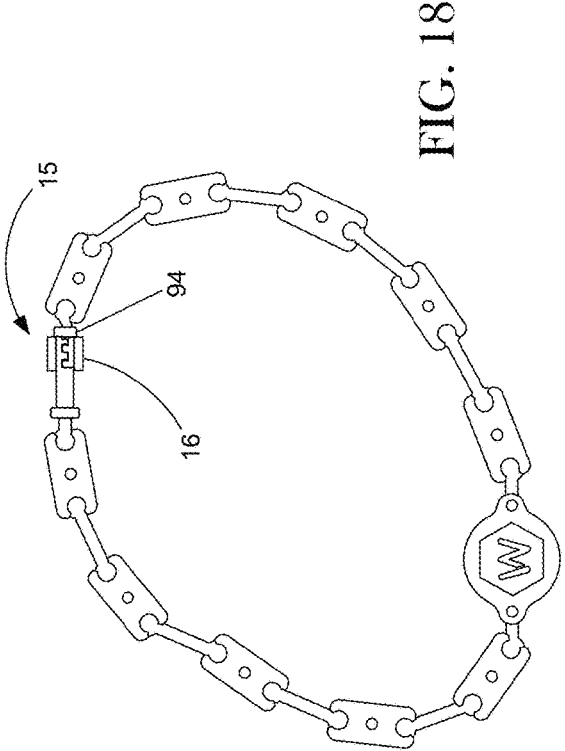
FIG. 16
FIG. 17
FIG. 18

PET COLLAR

The present invention relates to devices for pets, and in particular, to pet collars.

BACKGROUND OF THE INVENTION

Domesticated dogs and other pets are found throughout the world. They offer companionship, protection and love for their families. Additionally, dogs can be trained to serve law enforcement, search and rescue organizations and the military. They work on farms and on ranches.

It is important that dog owners provide optimum care for their dogs. Dogs need to be properly fed, trained, and exercised. Additionally, dog owners must purchase necessary accessories so that they can bring their dog out into society. A common accessory that pet owners buy for their dogs is the dog collar. Dog collars are available in a variety of styles to fit the needs of the pet and the pet owner. While many styles of collars are currently available, still there are very few adequate pet collars that are attractive, sturdy, convenient and offer safety features.

Near-field communication (NFC) tags allow two devices to communicate wirelessly. The technology can be embedded in a small tag to facilitate data transfer between nearby mobile phones, laptops, tablets, and other electronics. In the prior art, NFC pet tags are attached to a pet's collar. If the pet is lost then anyone with a smart phone can scan the NFC tag and automatically send the owner a personalized SMS text message enabling the owner to recover the pet.

What is needed is an improved pet collar.

SUMMARY OF THE INVENTION

The present invention provides a pet collar. A plurality of connecting rods is pivotally connected via a ball-and-socket connection to a plurality of socket segments. A center section is pivotally connected via a ball-and-socket connection to two innermost socket segments. A collar connector is pivotally connected via a ball-and-socket connection to two outermost socket segments. In a preferred embodiment the collar connector includes a slidable magnet for locking the collar connector. Also, in a preferred embodiment the center section included a NFC tag for pet safety and identification.

BRIEF DESCRIPTION OF THE DRAWINGS

FIGS. 2-7 show a preferred socket segment and connecting rod.

FIGS. 16-18 show a preferred method of utilizing the present invention.

DETAILED DESCRIPTION OF THE PREFERRED EMBODIMENTS

Figure 1:
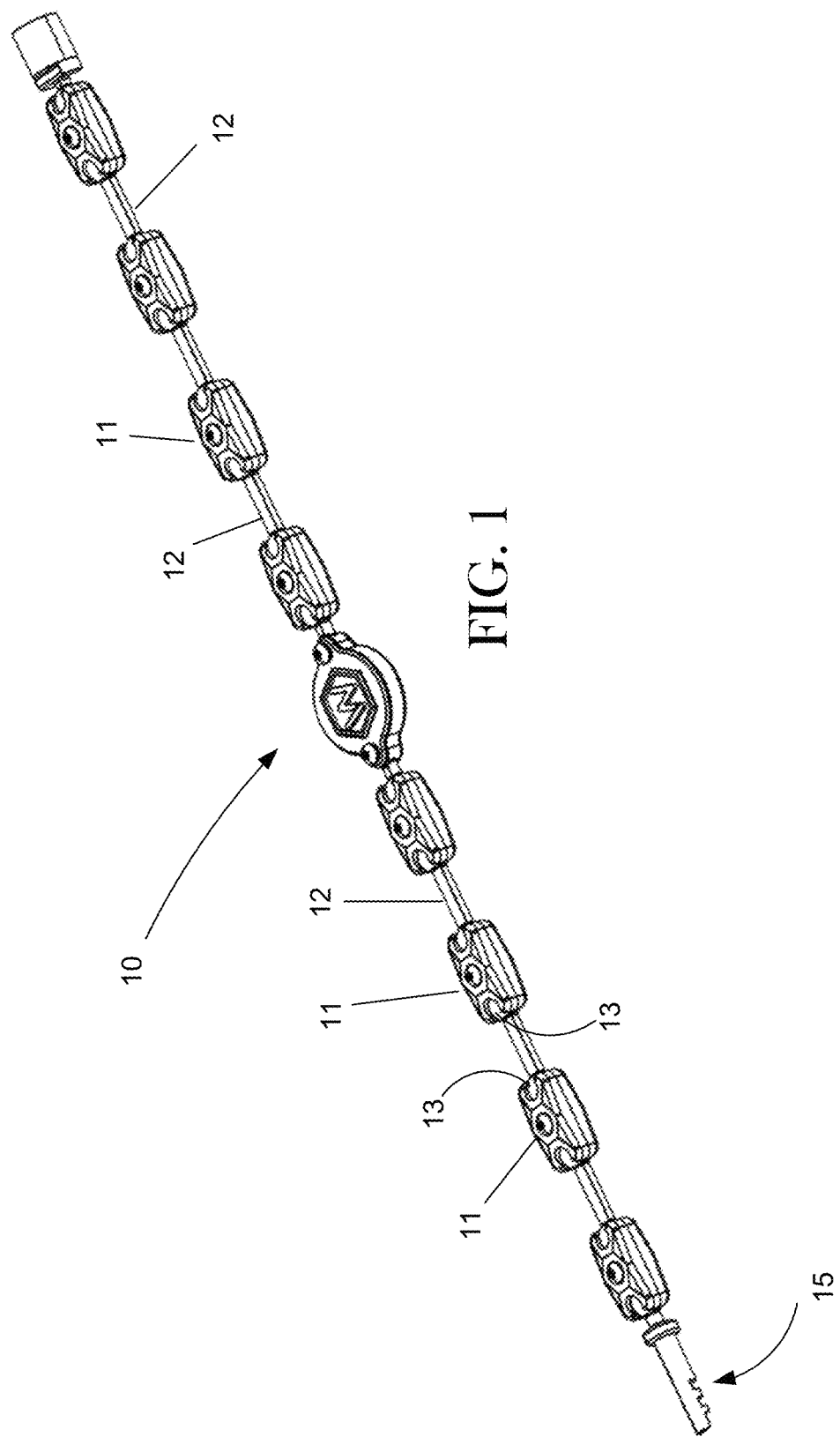
FIG. 1 shows a preferred embodiment of the present invention.

FIG. 1 shows a preferred embodiment of the present invention. Pet collar 10 includes a plurality of socket segments 11. Socket segments 11 are connected by a plurality of connecting rods 12. Each connecting rod 12 has two rigidly connected balls 13 at each end, as shown. Each connecting rod 12 is connected to a socket segment 11 via socket balls 13 to form a pivotal ball-and-socket connection, allowing for a full pivot motion between connecting rods 12 and socket segments 11. Connecting rods 12 and socket segments 11 may be added or removed to customize the length of collar 10, as desired. Components of collar connector 15 are attached to each end of collar 10 to form a functional pet collar. Collar 10 includes center section 20. Center section 20 preferably houses an NFC tag for pet identification purposes.

Figure 2:
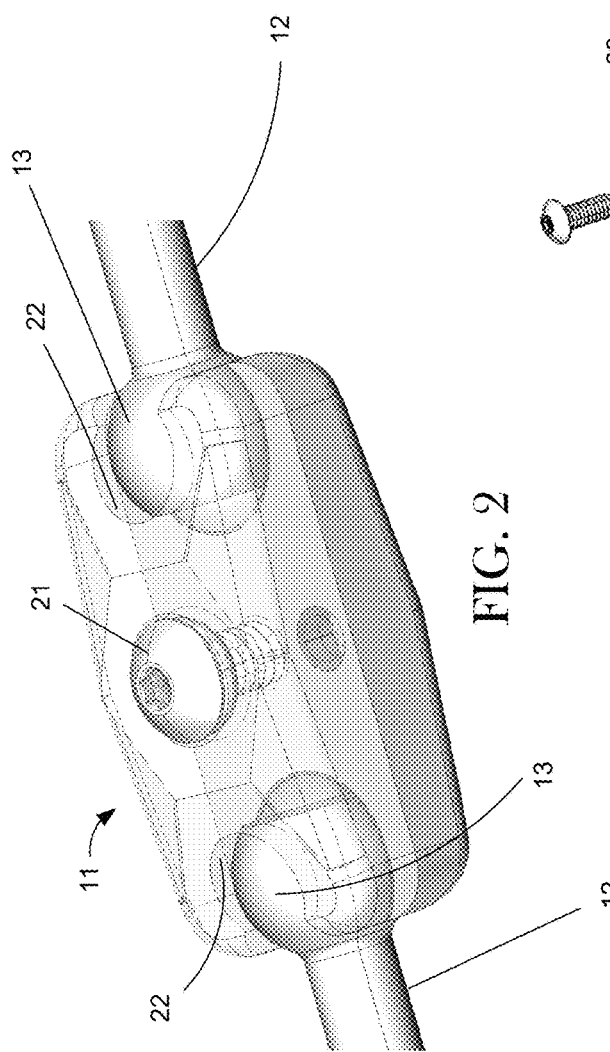

FIGS. 2-7 show detailed views of socket segment 11 and connecting rod 12. FIG. 2 shows a perspective close up view of socket segment 11 housing two connecting rods 12. Socket segment 11 is secured by screw 21. Balls 13 are housed within sockets 22 and provide for a pivot connection.

Figure 3:
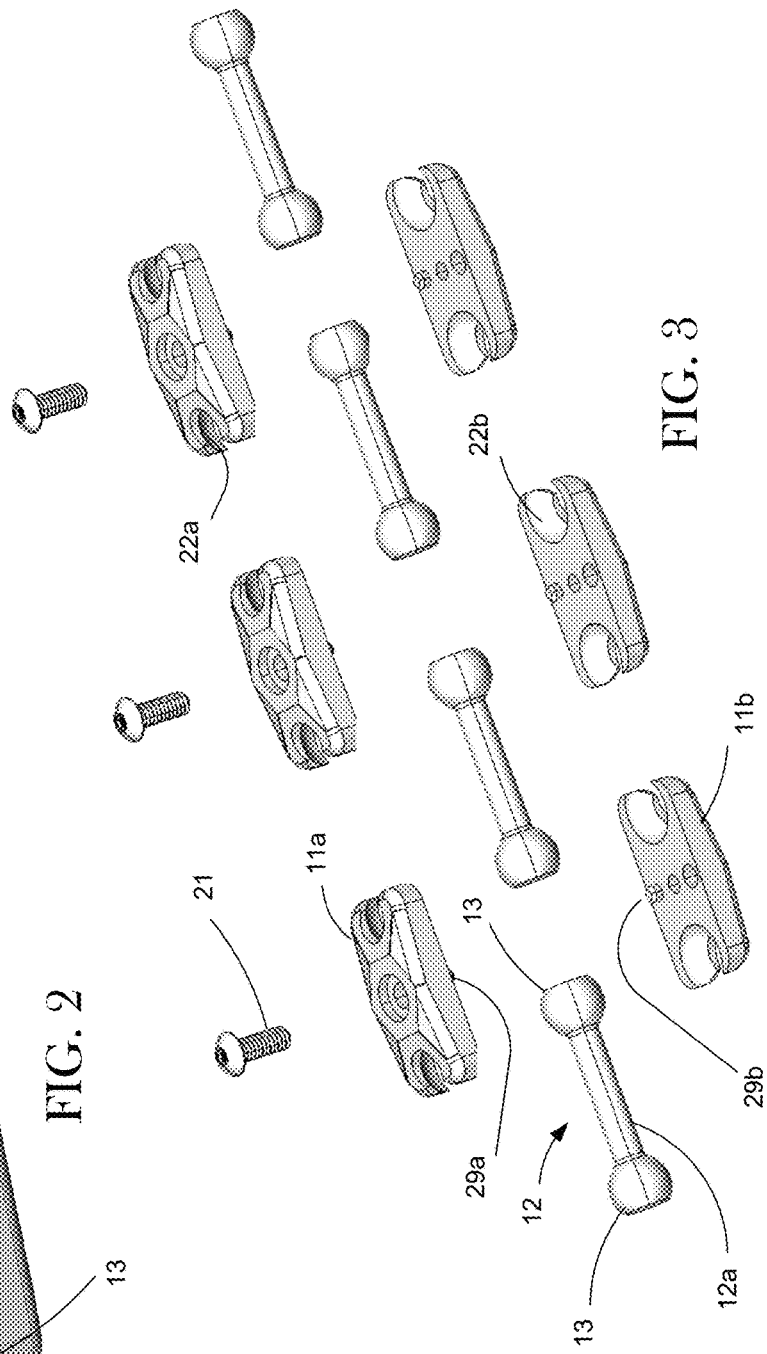
Figure 8:
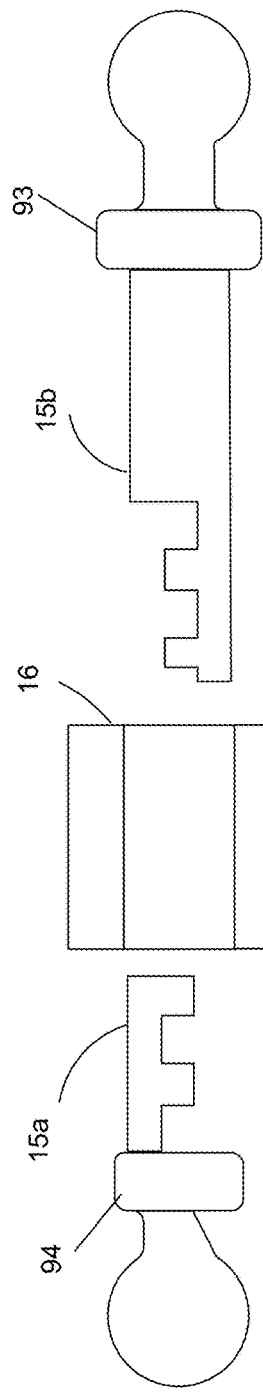
FIGS. 8-11 show a preferred collar connector.

FIG. 3 shows an exploded view of socket segment 11 and connecting rod 12. Socket segment 11 includes upper segment 11a and lower segment 11b. Socket recesses 22a and 22b form socket 22 (FIG. 2). Upper segment 11a includes alignment pin 29a and lower segment 11b includes alignment pin 29b. See also FIGS. 4-7. Connecting rod 12 includes socket balls 13 and extension rod 12a.

FIGS. 8-11 show detailed views of collar connector 15. Components of collar connector 15 are connected to outermost socket segments 11d and 11e (FIG. 16) and include small key 15a, large key 15b and slidable magnet 16. Support sections 93 and 94 are both magnetized and will attract slidable magnet 16.

Figure 9:
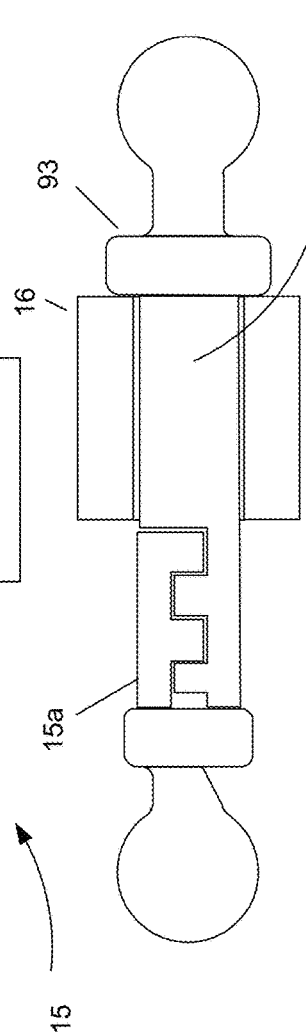

In FIG. 9, the user has engaged the teeth of small key 15a with the teeth of large key 15b. Slidable magnet 16 has been attracted to support section 93. Collar connector 15 is not locked.

Figure 10:
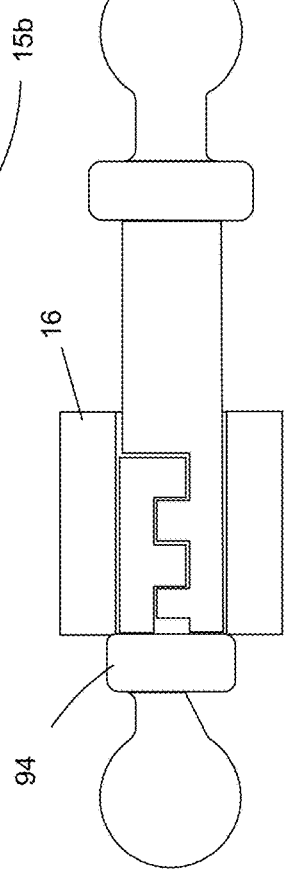

In FIG. 10, with his fingers the user has slid slidable magnet 16 towards support section 94. Slidable magnet 16 is attracted to support section 94 via magnetic force and remains positioned as shown. Collar connector 15 is locked.

Figure 11:
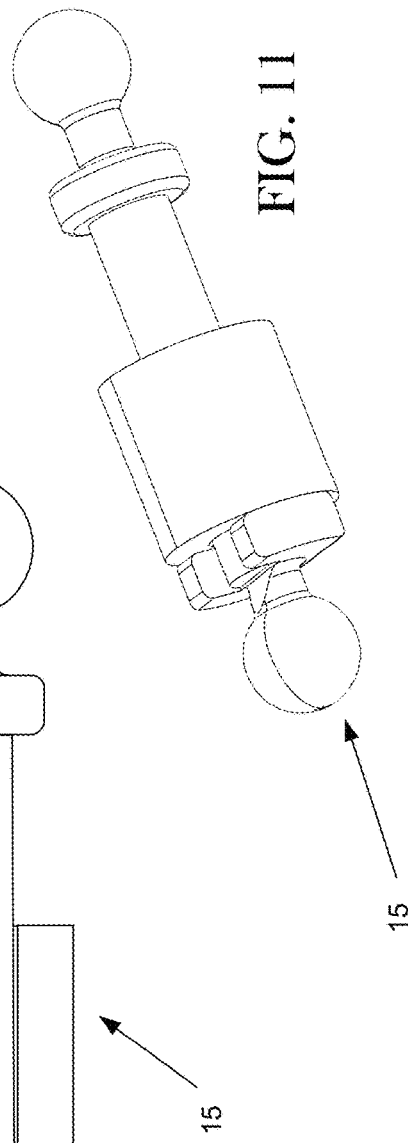
Figure 12:
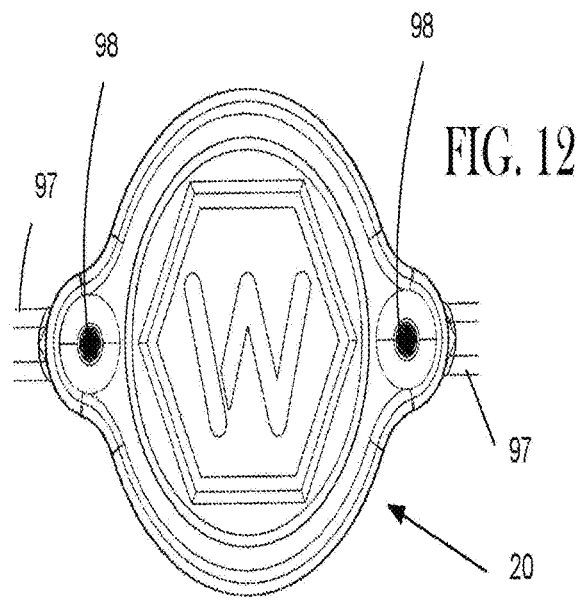
FIGS. 12-15 show a preferred center section.
Figure 14:
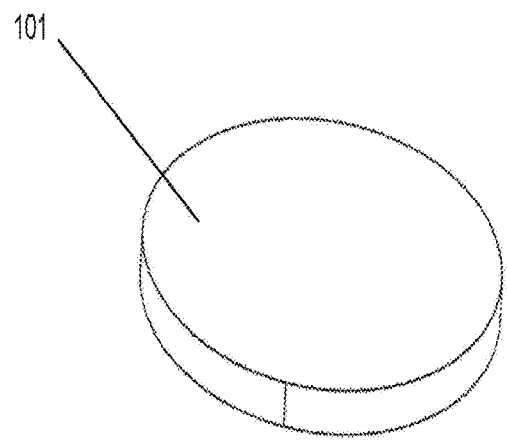
Figure 13:
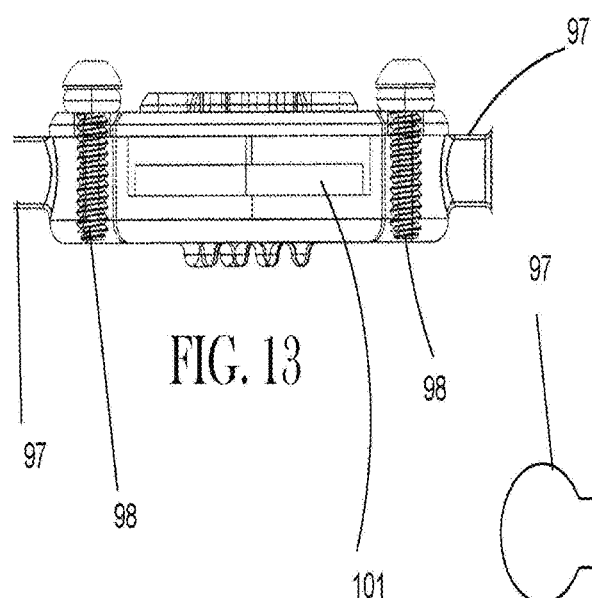
Figure 15:
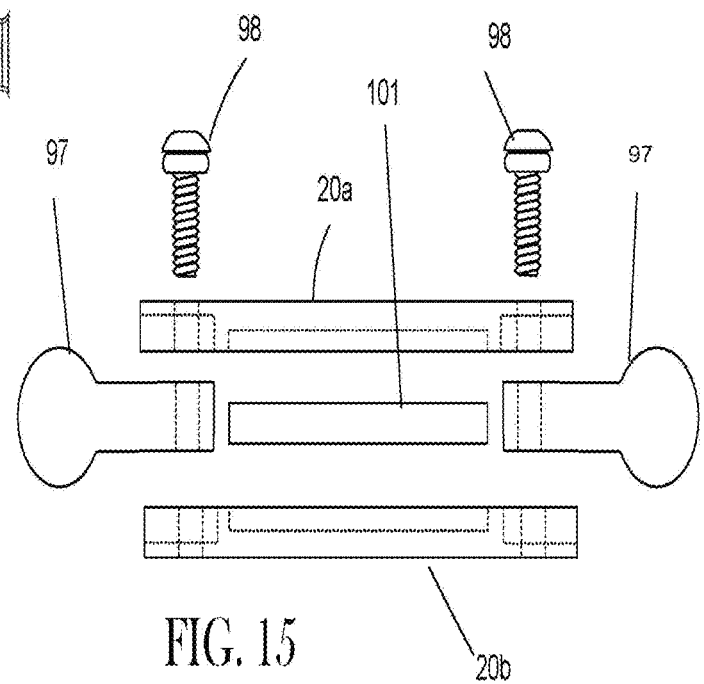

FIG. 11 shows a perspective view of collar connector 15 in a locked position.

FIGS. 12-15 show details of center section 20. Center section 20 includes upper section 20a and lower section 20b. Ball collar connectors 97 are rigidly connected to center section 20 via screws 98. Ball collar connectors 97 are pivotally connected to innermost socket segments 11a and 11b as shown (FIG. 16). Center section 20 preferably includes NFC tag 101 sandwiched between upper section 20a and lower section 20b.

FIGS. 16-18 illustrate the utilization of preferred pet collar 10.

In FIG. 16, the user has positioned pet collar 10 to be connected to form a functional pet collar. Preferably, the user has draped the collar around a pet's neck and is ready to connect the ends of the collar together.

In FIG. 17, the user has engaged the teeth of small key 15a with the teeth of large key 15b. Slidable magnet 16 has been attracted to support section 93. Collar connector 15 is not locked.

In FIG. 18, with his fingers the user has slid slidable magnet 16 towards support section 94. Slidable magnet 16 is attracted to support section 94 via magnetic force and remains positioned as shown. Collar connector 15 is locked.

Figure 19:
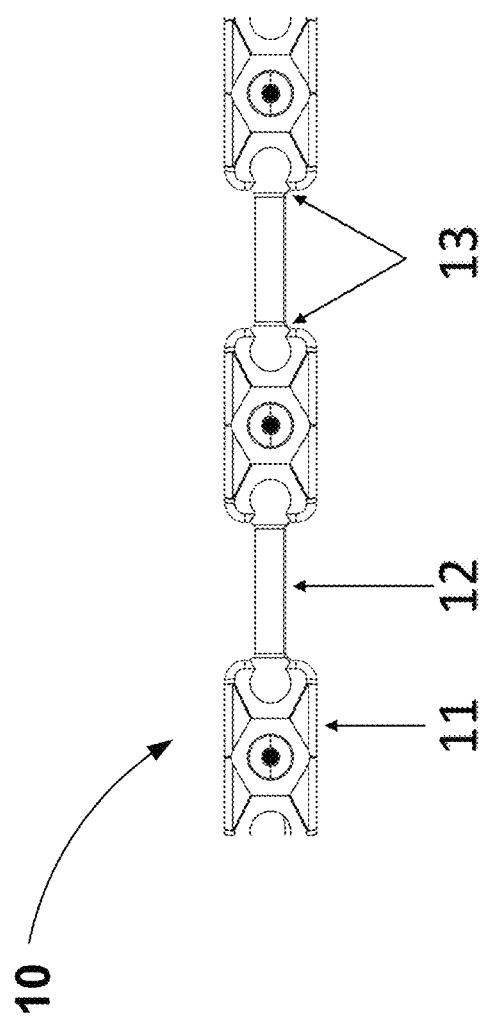
FIG. 19 shows a preferred collar.

A beneficial design feature of collar 10 is that additional leash attachment features (such as clips or rings) are eliminated. For example, collar 10 may be specifically sized to a corresponding canine and circumferentially locked (FIG. 19). Anywhere on collar 10 is then considered to be a leash attachment point depending on the circumference of the leash's attachment clip. If the circumference of the leash's attachment clip is smaller than the circumference of socket segments 11, then the leash's attachment clip can be attached to any connecting rod 12 which will keep it positioned on the connecting rod and positioned between the rigidly connected balls 13.

While the present invention has been described in terms of preferred embodiments, the reader should consider these described embodiments only as particular embodiments. Many other embodiments are possible. Therefore, the reader should determine the scope of the present invention by the claims and their legal equivalents.

What is claimed is:

1. A pet collar, comprising:
   A. a plurality of socket segments,
   B. a plurality of connecting rods, each connecting rod pivotally connected via a ball-and-socket connection between two of said plurality of socket segments,
   C. a center section pivotally connected via a ball-and-socket connection between two innermost socket segments of said plurality of socket segments, and
   D. a collar connector connected between two outermost socket segments of said plurality of socket segments, wherein said collar connector comprises:
      a small key,
      a large key meshed with said small key,
      a small key magnetic support section,
      a large key magnetic support section, and
      a slidable magnet slidingly connected between said small key magnetic support section and said large key magnetic support section, wherein said collar connector is locked when said slidable magnet is positioned over both said small key and said large key and attracted to said small key support section and wherein said collar connector is unlocked when said slidable magnet is not over said small and said large key and when said slidable magnet is attracted to said large key support section.

2. The pet collar as in claim 1, wherein each of said plurality of socket segments comprises:
   A. an upper segment,
   B. a lower segment rigidly connected to said upper segment via a connection screw, and
   C. two sockets.

3. The pet collar as in claim 1, wherein each of said plurality of connecting rods comprises:
   A. an extension rod,
   B. two socket balls, each of said two socket balls rigidly and distally connected to said extension rod.

4. The pet collar as in claim 1, wherein said center section comprises:
   A. an upper section,
   B. a lower section rigidly connected to said upper section, and
   C. an NFT tag sandwiched between said upper section and said lower section.

5. The pet collar as in claim 1, further comprising two ball collar connectors for connection to said two innermost socket segments of said plurality of socket segments.

* * * * *